United States Patent [19]

Ellingham et al.

[11] Patent Number: 5,108,968
[45] Date of Patent: Apr. 28, 1992

[54] PROCESS FOR TREATING A MATERIAL WHEREIN THE MATERIAL IS SUSPENDED IN A GASEOUS ATMOSPHERE

[75] Inventors: Robert E. Ellingham, Long Beach, Calif.; James W. Barnes, Baytown, Tex.

[73] Assignee: Recat, Inc., Long Beach, Calif.

[21] Appl. No.: 505,881

[22] Filed: Apr. 6, 1990

[51] Int. Cl.⁵ .................. B01J 38/34; B01J 20/34; F26B 3/08; F26B 17/00
[52] U.S. Cl. .................................. 502/43; 34/10; 34/57 A; 208/155; 208/164; 208/216 R; 208/310 R; 208/310 Z; 209/138; 422/144; 502/34; 502/41
[58] Field of Search .................. 502/34, 41, 43; 422/144; 208/150, 155, 164

[56] References Cited

U.S. PATENT DOCUMENTS

| | | | |
|---|---|---|---|
| Re. 32,239 | 9/1986 | Schwartz | 502/45 |
| 2,199,838 | 5/1940 | Tyson | 502/52 |
| 2,374,660 | 5/1945 | Belchetz et al. | 502/43 |
| 2,384,311 | 9/1945 | Kearby | 208/310 R |
| 2,417,275 | 3/1947 | Thompson et al. | 502/43 |
| 2,461,838 | 2/1949 | Neuhart | 502/52 |
| 2,538,833 | 1/1951 | DeRycke | 34/52 A |
| 2,541,662 | 2/1951 | Palmer | 422/144 |
| 2,683,685 | 7/1954 | Matheson | 209/138 |
| 2,704,154 | 3/1955 | Huth | 422/144 |
| 2,903,800 | 9/1959 | Skoglund | 34/57 A |
| 3,004,926 | 10/1961 | Goering | 502/44 |
| 3,617,523 | 11/1971 | Spurlock | 502/52 |
| 4,007,131 | 2/1977 | Gillespie et al. | 208/108 |
| 4,370,222 | 1/1983 | McGovern et al. | 208/113 |
| 4,473,658 | 9/1984 | Schwartz | 502/45 |
| 4,480,144 | 10/1984 | Smith | 585/481 |
| 4,507,397 | 3/1985 | Buss | 502/38 |
| 4,610,972 | 9/1986 | Hughes | 502/52 |
| 4,687,637 | 8/1987 | Greenwood | 422/62 |
| 4,724,271 | 2/1988 | Martindale | 585/415 |
| 4,832,921 | 5/1989 | Greenwood | 422/223 |
| 4,849,092 | 7/1989 | Ham et al. | 208/140 |
| 4,859,643 | 8/1989 | Sechrist et al. | 502/37 |

Primary Examiner—Paul E. Konopka
Attorney, Agent, or Firm—Pravel, Gambrell, Hewitt, Kimball & Krieger

[57] ABSTRACT

A process for treating catalytic particles in a vertical chamber is disclosed. The catalytic particles comprise spent catalysts from such hydroprocesses as hydrocracking and hydroreforming. The process comprises suspending the catalytic particles in a gaseous atmosphere of a vertical chamber for a time sufficient to remove the waste products from the catalytic particles. The process can be used to remove carbonaceous and sulfur deposits from the surface of the particles as well as volatile hydrocarbons and hydrates.

6 Claims, 1 Drawing Sheet

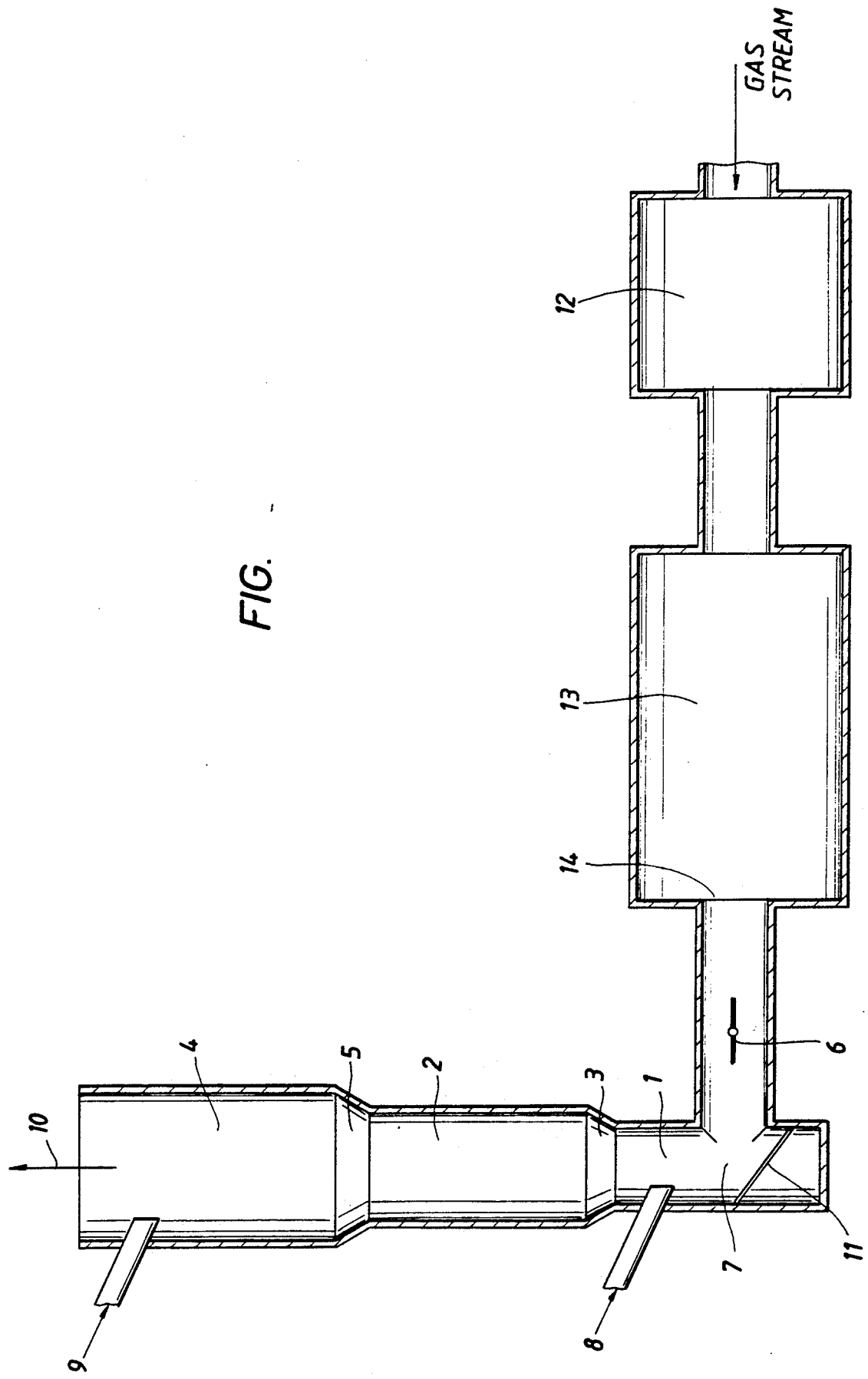

PROCESS FOR TREATING A MATERIAL WHEREIN THE MATERIAL IS SUSPENDED IN A GASEOUS ATMOSPHERE

This invention relates to a process of treating catalysts and adsorbents used in the petroleum processing industry. It specifically relates to a process of suspending such material in a gaseous atmosphere within a vertical chamber while penetrating a gaseous stream into the infrastructure of the particles being treated. The process can be used to regenerate spent catalysts and adsorbents by oxidizing coke or carbonaceous deposits from them. This process can further be used to remove volatile hydrocarbons as well as entrapped moisture from the spent material.

BACKGROUND OF THE INVENTION

Adsorbents used in the petroleum and gas industry typically consist of alumina, silica, zeolite, or activated carbon. They are generally used for dehydration of and/or the separation of impurities and molecular components within a hydrocarbon or gas stream.

Catalysts employed in the industry generally consist of a carrier, which can be the same type of material that is used for the adsorbent plus catalytic metals. The metal is impregnated or compounded in the carrier and include noble and non-noble metals such as platinum, rhenium, cobalt, molybdenum, nickel, tungsten and palladium as well as rare earth metals. The catalysts are employed in various hydroprocessing units. For instance, when combined with hydrogen and heat such catalysts can be used to change the molecular structure of oil, as in hydrocracking. In addition, such catalysts can be employed to remove impurities as in hydrodesulfurization and hydronitrification; saturate, with hydrogen, hydrocarbon streams, as in hydrogenation; and dehydrogenate feed streams, as in reforming.

Such adsorbents, as well as catalysts, become deactivated by the build-up of coke or polymer deposits on and within the infrastructure of the particles. Such build-up continues during operation of the processing unit, seriously impairing the efficiency as well as the selectivity of the process. Such deposits are normally removed from the catalytic particles by contacting them with oxygen. The reaction, being highly exothermic, can be represented by the following:

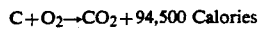

$$C + O_2 \rightarrow CO_2 + 94{,}500 \text{ Calories}$$

The thermal stability of the catalysts and adsorbents treated by such processes vary. Normally, the particles are destroyed at temperatures of approximately 1000° F. In addition, agglomeration of the metal can occur at temperatures as low as 900° F. Unless the amount of heat generated from the reaction is controlled or removed, the catalyst or adsorbent can be permanently destroyed.

A common method of controlling this exothermic reaction is to dilute the oxygen content of the gas with steam or an inert gas. By decreasing the concentration of oxygen in the incoming gas, the efficiency of the regeneration process however is decreased.

A method of efficiently removing the exothermic heat of reaction is thus desired for the processing of greater quantities of spent catalyst and adsorbents.

SUMMARY OF THE INVENTION

The present invention is drawn to a method of removing contaminants from spent particles, especially those from hydroprocessing, dehydration or molecular adsorbent separation units. In particular, the invention is drawn to a method of regenerating spent catalysts and adsorbents by removing from their surfaces and infrastructure such contaminates as coke and polymer formations; entrapped moisture and hydrates; and volatile hydrocarbons.

The process of this invention comprises suspending the spent particles in a vertical chamber by a gaseous stream for a time sufficient for the contaminants to be removed. The gaseous stream not only suspends the material but permeates the infrastructure of the material. The exit gas containing the contaminants or waste reaction products are removed from the vertical chamber with the exothermic heat of reaction.

BRIEF DESCRIPTION OF THE DRAWINGS

The FIGURE illustrates a vertical column which may be employed in the process of this invention.

DETAILED DESCRIPTION OF THE INVENTION

The present invention is drawn to a method of treating a spent catalyst or adsorbent in the petroleum processing industry.

The invention may be used to regenerate spent catalysts from such hydroprocessing processes as: hydroreforming, hydrocracking, hydrotreating, hydrogenation, and olefinic alkylation. In addition, the invention may be used to regenerate spent adsorbents from molecular extraction, separation or dehydration units. In addition, the process of this invention may be used to strip or remove volatile hydrocarbons or entrapped moisture from spent catalysts or adsorbents.

In particular, the invention is drawn to the removal of contaminants from the internal and external surfaces of spent catalysts and adsorbents from hydrocracking processes. Such contaminants are primarily coke and polymer formations which are deposited on the surfaces and infrastructure of the particles during normal operations.

In the process of this invention, the spent materials are suspended in a vertical chamber by a gas, often enriched in oxygen. In addition to removing surface contaminants, the gas permeates the particles internally and removes the contaminants from the infrastructure of the material.

The vertical cylindrical column in which the particles are suspended is comprised of at least two distinct segments. The segment of smaller diameter, referred to as the "entry zone", is the zone of the column to which the heated gas is first introduced. In addition, it may serve as the entry zone for the spent particles. The bottommost portion of this zone may further serve as the product removal zone.

The second zone, referred to as the "treatment zone", is the reaction chamber. This zone is usually located above the gas entry zone. It is in this zone that the particles to be treated are suspended. The treatment zone is characterized by a diameter which is larger than the diameter of the entry zone. A (first) tapered section connects the treatment zone to the entry zone. The height of the tapered section is generally between about 10 to about 30% of the height of the treatment zone.

The entry zone is defined as the portion of the vertical column below the (first) tapered section. The volume-to-volume ratio of the entry zone to the treatment zone of the vertical column is between from about 1:2 to about 1:5, preferably from about 1 to about 3. The diameter of the treatment zone is generally between from about 15 to about 200 cm, preferably about 50 to about 100 cm. The diameter of the entry zone is generally between about 50 to about 75% of the diameter of the treatment zone. The height of the treatment zone within the column can be changed by varying the velocity of the gaseous stream as well as the diameter of the zone.

The vertical column may further comprise, in addition to the gas entry and treatment zones, zones of incremental diameter increases. Such zones normally are above the treatment zone, separated by a (second) tapered section having a height similar to the height of the tapered section between the entry zone and the treatment zone. For instance a third zone may serve as a gas isolation zone. The diameter of this zone is greater than the diameter of the treatment zone and generally is between from about 15 to about 250 cm, preferably between about 20 to about 100 cm. The increased diameter of the gas isolation zone (compared to the diameter of the treatment zone) retards the velocity of the gas stream and thus ensures the suspension of the catalytic particles in the treatment zone. When desired, the volume to volume ratio of the treatment zone to the gas isolation zone is normally between from about 1:2 to about 1:4, preferably from about 1 to about 3.

Gas is normally introduced in the gas entry zone prior to the introduction of the material to be treated. Depending on the material to be treated, and the operation being conducted on the material, i.e., regeneration, dehydration or hydrocarbon removal, the gaseous atmosphere may be composed of an inert gas or an oxygen-containing gas, i.e. between 1 to 100 percent oxygen.

Where the treatment process consists of regenerating the spent catalyst by removal of deposits of coke or polymer formations, the gaseous atmosphere most preferably contains oxygen. The oxygen content of the gas stream can vary in the range of about 10 percent by volume to about 90 percent by volume. Preferably the oxygen component of the gas stream is about 20 percent by volume. A convenient gas stream for such purposes is atmospheric air. In addition, the molecular regeneration gas may have an enriched oxygen content, in excess of 35 mole percent oxygen. Such enriched oxygen content is particularly desired where the spent catalyst has low carbon content. In such instances, the oxygen content is normally between about 22 to about 35 mole percent, most preferably about 26 to 30 mole percent.

The velocity of the gas stream must be sufficiently high for the treated particles to "float" or remain in suspension in the vertical column. The minimum velocity is that needed to overcome the gravitational pull on (density of) the treated particles. The velocity may not be so high as to transport the material out of the reactor. The preferred velocity of the gaseous atmosphere varies with the density of the treated materials, but usually is held constant between 400 and 900 standard cubic feet per minute (scf/min).

The spent catalysts regenerated in such processes are typically cylindrical and/or spherical shaped and have a diameter ranging from about 0.80 mm to about 3.25 mm, usually around 1.6 mm. The particles are further characterized by a length between about 1.6 mm to about 6.5 mm. If the catalytic particles are oil wet, it is preferable to remove the oil in a separation step prior to regenerating the catalyst. Such separation can be performed as described herein for the removal of volatile hydrocarbons. Either an inert gas, such as nitrogen, or a low oxygen containing gas is employed in such processes.

Generally, the gaseous stream is introduced into the vertical chamber at a temperature sufficient to initiate the desired reaction in the column. For example, where the operation being conducted in the column is the removal of coke, sulfur or polymer formations, the temperature in the column is between about 500° to approximately 1000° F., normally between 600° and 900° F. The gas stream is generally introduced into the reactor as a heated gas by means of a heat exchanger. It is most desirable that the temperature of the gaseous stream in the vertical chamber be maintained constant at the same temperature as it was introduced.

Thermocouples placed at intervals throughout the zones of the vertical chamber monitor the temperature, as well as completion of reaction. The desired time-temperature profile naturally will differ depending on the process being conducted in the vertical chamber.

Once the gaseous atmosphere has been established at the desired temperature and velocity, the spent material is added to the vertical column. The amount of material which is added is limited by the geometric volume of the reaction zone and the mass of the material being treated. The material may be added to the vertical column in the zone either anterior or posterior to the treatment zone. For instance, where the column comprises more than two zones, the spent material may be added to the uppermost zone. In a three zone column, for example, the product may enter the column at the gas isolation zone. The material enters the column through a separate feed line.

When the material is fed into the gas entry zone, it is drawn into the treatment zone by a vacuum caused by the venturi effect of the process gases exiting the gas entry zone and entering the treatment zone. The material will continue to be drawn into the treatment zone until the material in the treatment zone causes an equilibrating effect of pressure between the gas entry and treatment zones. In other words, the amount of material which is capable of being fed into the column is dependent on the geometric design of the column. Thus, catalyst added in an amount in excess of that which can be suspended in the treatment zone will drop to the lower zones of the column.

When the material is introduced into the vertical chamber through a zone above the treatment zone, such as the gas isolation zone, the material falls freely to the treatment zone. (The velocity is preferably predetermined to float or suspend the material.)

The process of this invention is particularly useful in the regeneration of catalysts obtained in such hydroprocessing processes as hydrocracking and reforming. Catalysts obtained from such processes are deactivated by coke and polymer deposits. In this embodiment of this invention, the spent catalytic particles are suspended in the treatment zone of the vertical chamber by a gaseous stream for a time sufficient to remove the coke and/or polymer deposits from them. The exothermic heat is efficiently removed by copious amounts of the gaseous stream passing through and around the catalyst particles. Such removal is effectuated primarily by the high volume of gases employed. The gas stream employed for this catalytic regeneration process is an oxygen-containing gas and normally contains about 21 percent oxygen and is generally heated to 850° F. When the spent material is introduced into the reaction zone, the thermocouples in the treatment zone normally indicate an immediate 50°-80° F. drop in temperature, which occurs for approximately 15 seconds, after which the temperature in the reaction Zone increases. After about 1 minute the exothermic heat of reaction peaks out at about 50°-80° F. above the temperature of the inlet gas (850° F.). The reaction zone slowly comes to equilibrium with the inlet gas temperature after an additional two to three minutes. Adjusting the oxygen content of the gaseous atmosphere to approximately 35 percent reduces the time required for the reaction to be completed. Adjusting the oxygen content to less than 21 percent in the gaseous atmosphere increases the time required to complete the reaction.

The high velocity of the gas through the vertical column maintains a relatively constant temperature in the treatment zone by removing the contaminants from the spent particles. In addition, the exhaust gas exiting the vertical chamber contains the exothermic heat of reaction generated in the treatment process as well as catalyst dust and fines. By the process of this invention, the temperature can remain relatively constant by the continuous removal from the reactor of the exothermic heat of reaction. The temperature maintained in the vertical chamber is less than the deactivation temperature of the catalytic particles.

Upon completion of reaction, the gas flow is interrupted and the regenerated catalytic particles drop to the bottommost zone of the vertical chamber and are collected. The exhaust flue gas with entrained waste products, including catalyst dust and fines along with any unconverted oxygen, exit the vertical chamber for conventional treatment. For instance, the flue gas may be passed to equipment downstream, such as a plenum chamber, for discharge by procedures well known in the art.

The process of this invention can further be employed to remove volatile hydrocarbons and hydrates from spent catalytic particles preferably prior to subjecting the catalyst to the aforementioned regeneration process.

Where the desired process is dehydration, the gaseous stream, comprising either an inert or oxygen-containing gas is introduced at a temperature between about 250° and 350° F. (If the gaseous atmosphere contains oxygen, the temperature must be maintained at a temperature less than that to initiate the combustion reaction.) Upon introduction of the material to be dehydrated, a large temperature drop in the reaction zone is observed. The time-temperature slowly but steadily, recovers to the initial gaseous temperature of 250°-350° F. The dehydration is complete when the initial temperature is reached. This can take from 2 to 4 minutes depending on the material and amount of moisture entrapped in the material.

When the process is used for the removal of hydrocarbons, an inert gas is normally employed. (While an oxygen contains gas comprising of 3-5 percent can be used, a small amount of hydrocarbon cracking normally results. The gaseous atmosphere is heated to the vaporization point of the predominant hydrocarbon deposited on the material being treated. The temperature of the reaction zone normally drops upon the initial entry of material. The magnitude of the temperature drop is usually dependent on the concentration of the hydrocarbon present. Like dehydration, the time-temperature profile increases at a steady rate, until the temperature of the inlet gaseous atmosphere is reached.

The process of this invention can be either incorporated into existing units as part of a grassroots plant or a bottle-neck removal program wherein the spent materials are withdrawn from the petroleum process reaction units and transported to systems for the process recited herein.

Referring now to FIG. 1 the vertical column employed in the process of this invention comprises at least two distinct zones, the entry zone 1 and treatment zone 2. The entry zone and treatment zone are separated by tapered section 3. The column may optionally contain a third zone, the gas isolation zone 4. The gas isolation zone is separated from the treatment zone by tapered section 5. The gaseous feedstream, 6, enters the lower portion of the column at 7. The spent particles enter the column at either inlet port 8 or inlet port 9. The particles are suspended in the gaseous stream in the treatment zone 2 of the column.

The requisite velocity of the gaseous feedstream is obtained by passing the stream through blower, 12. The blower is capable of providing about 200 to about 1,000 scf/min of gas from one to ten inch static pressure through it's horizontal pipe. The stream is propelled by the blower and enters heat exchanger, 13. The gaseous atmosphere is heated indirectly by use of the heat exchanger, to a desired temperature to accomplish the objectives of the process, usually between 200° and 1000° F. The heat exchanger can be a furnace heated with natural gas, such as propane or combusted gas. In order to maintain maximum oxygen content, it is preferred that the heating gas not be admixed with the air stream entering the vertical chamber. When oxygen concentration is desired at 18% or less direct fired furnace may be employed. The pipe size is reduced at 14 producing a venturi effect at the point where the spent material is introduced to the vertical column. The stream enters the vertical chamber at the entry zone 1 via flapper valve. The gaseous velocity will support about one pound of spent material per cubic foot volume, again depending on the density of the material in the treatment zone. The flue gas containing vaporized reaction products ascends to the gas isolation zone, 4, and exits the vertical chamber at 10 with the exothermic heat of reaction.

Upon termination or reduction of the velocity of the feedstream, the catalyst falls to the bottom of the vertical chamber and is removed at exit port 11.

EXAMPLE 1

Spent nickel molybdenum hydrotreating catalyst supported on alumina was regenerated in a unit similar to that illustrated in FIG. 1. The dimensions of the gas entry zone were 10 cm (diameter) by 61 cm (height). The treatment (middle) zone was 15.25 cm (diameter) by 122 cm (height). The top section of the vertical column, the gas isolation zone, was 20.25 cm in diameter and 91.5 cm in height. Exhaust and reaction gas products exited the column for conventional environmental treatment. Thermocouples were placed throughout each zone to record the temperature profile of the treatment process.

The velocity of the gaseous atmosphere was established at 650 cubic feet per minute. The gaseous atmosphere was air, containing about 21 percent oxygen, and heated to a temperature of 750° F. One pound of the spent hydrotreating catalyst comprising nickel and molybdenum supported on an alumina base containing 4.83 weight percent sulphur and contaminated with carbonaceous deposits of 11.53 weight percent was introduced into the regeneration zone. Upon addition of the spent catalyst into the regeneration zone the temperature of the zone dropped from 750° to, after 15 seconds, 692° F., at which time the temperature began to rise. After 1 minute, the temperature in the reaction zone peaked at 848° F., and began to slowly equilibrate to the 750° F. gas temperature. At the expended time, from introduction of 3 minutes, the temperature of the reactor zone equilibrated with the gas temperature, the gas flow was momentarily diverted, and the regenerated catalyst dropped to the bottom of the column. The carbon and sulphur content of regenerated catalyst was 0.5 percent and 0.3 percent, respectively. The surface area recovery was 92 percent of fresh catalyst value.

EXAMPLE 2

Spent cobalt molybdenum hydrotreating catalyst supported on alumina was regenerated in a unit substantially similar to that illustrated by FIG. 1. The dimensions of the unit were the same as in example 1. The desired velocity of the gaseous atmosphere was established at 650 cubic feet per minute. The gaseous atmosphere was air, containing about 21 percent oxygen. The gas was heated to a temperature of 858° F. One pound of the spent hydrotreating catalyst comprising cobalt and molybdenum supported on an alumina base containing 6.99 weight percent sulphur and contaminated with carbonaceous deposits of 9.88 weight percent was introduced into the regeneration zone. Upon addition of the spent catalyst into the regeneration zone the temperature of the zone dropped from 858° F. to, after 15 seconds, 801° F. Shortly thereafter, the temperature began to rise. At the expended time from introduction of 1 minute, the reaction zone has peaked at the temperature of 907° F., and began to slowly equilibrate to the 858° F. gas temperature. At the expended time from introduction of 3.5 minutes the temperature of the reactor zone had equilibrated with the gas temperature, the gas flow was momentarily diverted, and the regenerated catalyst dropped to the bottom of the column. Carbon and sulphur content of regenerated catalyst was 0.2 percent and 0.4 percent, respectively. The surface recovery was 95 percent of fresh catalyst value.

EXAMPLE 3

Spent molecular sieve adsorbent of 4 angstroms was regenerated in a unit illustrated by FIG. 1. The dimensions of the unit were the same as in Example 1.

The desired velocity of the gaseous atmosphere was established at 600 cubic feet per minute. The gaseous atmosphere was air, containing about 21 percent oxygen. The gas was heated to a temperature of 750° F. One pound of the spent molecular sieve contaminated with carbonaceous deposits of polymer formation of 4.30 weight percent was introduced into the regeneration zone. Upon addition of the spent molecular sieve in the regeneration zone the temperature of the zone dropped from 750° to, after 15 seconds, 713° F. The temperature then began to rise. At the expended time from introduction of 45 seconds, the reaction zone had peaked at the temperature of 770° F., and began to slowly equilibrate to the 750° F. gas temperature. At the expended time from introduction of 2 minutes the temperature of the reactor zone had equilibrated with the gas temperature, the gas flow was momentarily diverted, and the regenerated molecular sieve dropped out through zone. The carbon content of regenerated catalyst was 0.1 percent. The surface recovery was 96 percent of fresh 4 A molecular sieve value.

Many modifications and variations besides the embodiments specifically mentioned herein may be made in the method and apparatus described herein and depicted in the accompanying drawings without substantially departing from the concept and scope of this invention. Accordingly, it should be clearly understood that the form of the invention described and illustrated herein is exemplary only, and is not intended as a limitation.

We claim:

1. A method of regenerating solid catalyst particles deactivated by deposits of coke and optionally sulfur in a vertically extended column having at least two distinct zones wherein the diameter of the first lower zone is about 50 to 75% of the diameter of the second upper zone, comprising:
   (a) introducing a gaseous feedstream containing oxygen and deactivated catalyst particles into the lower zone of the vertical column wherein the temperature of the feedstream is between from about 200° to about 1,000° F. and such that said gaseous feedstream flows vertically upward;
   (b) introducing the catalyst particles and the gaseous feedstream into the second zone and suspending the particles in the second zone by means of the flowing gaseous feedstream;
   (c) adjusting the velocity of the feedstream such that substantially all the catalyst particles float in the second zone and only catalyst dust and fines are carried out of the vertical column by the gaseous feedstream;
   (d) retaining the catalyst particles in the second zone for a time sufficient for the gaseous feedstream to permeate the infrastructure of the particles and reduce the coke contaminant on the catalyst to about 0.1-0.5 wt. % and the sulfur contaminant to about 0.1-0.5 wt. %;
   (e) allowing the gaseous feedstream containing coke and sulfur reaction products to exit from the top of the vertical column;
   (f) terminating the flow of the feedstream thereby allowing the catalyst particles to fall to the bottom of the vertically extending column; and
   (g) recovering the catalyst particles from the bottom of the vertically extending column.

2. The method of claim 1 wherein the gaseous feedstream is air.

3. The method of claim 1 wherein the gaseous feedstream is air enriched with oxygen.

4. The method of claim 1 wherein the deactivated catalyst is a deactivated hydroprocessing or hydrocarbon cracking catalyst.

5. The method of claim 1 wherein exiting gases are isolated in the vertically extending column in a third zone above the second zone, the diameter of said third zone being greater than the diameter of the second zone and sufficient to retard the velocity of said gases.

6. The method of claim 1, wherein additional deactivated catalyst is added to a third zone located above the second zone.

* * * * *